C. G. THEILING.
SWIVEL HOOK.
APPLICATION FILED JAN. 30, 1909.

942,681.

Patented Dec. 7, 1909.

Witnesses
J. S. L. Wright
R. M. Smith

Inventor
Carl G. Theiling,
By Victor J. Evans,
Attorney.

UNITED STATES PATENT OFFICE.

CARL G. THEILING, OF SPENCER, NORTH CAROLINA.

SWIVEL-HOOK.

942,681.  Specification of Letters Patent.  Patented Dec. 7, 1909.

Application filed January 30, 1909. Serial No. 475,193.

*To all whom it may concern:*

Be it known that I, CARL G. THEILING, a citizen of the United States, residing at Spencer, in the county of Rowan and State of North Carolina, have invented new and useful Improvements in Swivel-Hooks, of which the following is a specification.

This invention relates to swivel hooks such as are ordinarily employed in connecting watches to chains but it will of course, be understood, that as the description proceeds, the swivel hook herein shown and described is capable of a great number of applications and uses which will readily suggest themselves.

The principal object of the invention is to provide and construct a reliable connection of the body and hook proper and the ring or eye to which the chain is usually connected.

With the above and other objects in view, the invention consists in the novel construction, combination and arrangement of parts as herein fully described, illustrated and claimed.

Figure 1:
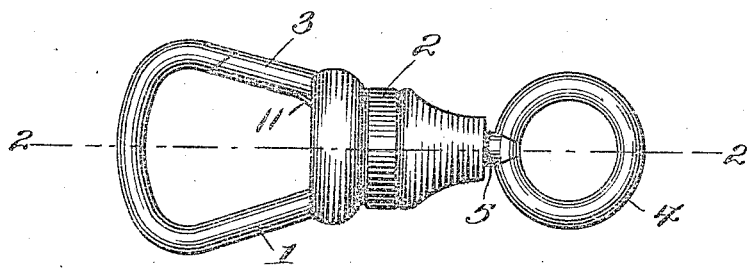
Figure 2:
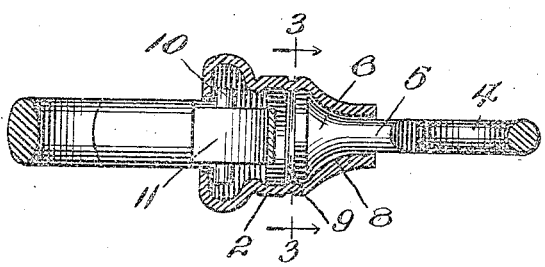
Figure 3:
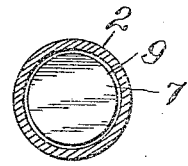
Figure 4:
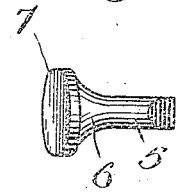

In the accompanying drawings:—Figure 1 is a plan view of a swivel hook embodying the present invention. Fig. 2 is a longitudinal section through the same, on the line 2—2 of Fig. 1. Fig. 3 is a cross section on the line 3—3 of Fig. 2. Fig. 4 is a detail perspective view of the same before the ring or eye is connected thereto.

Referring to the drawings, 1 designates the shank of the hook, 2 the main body or base of the hook and 3 the movable section of the hook, while 4 designates the ring or eye and 5 the stem which connects the ring 4 to the body or base of the hook.

In carrying out the present invention, the stem 5 is inserted through the larger end of the hollow or tubular base 2 from the larger end and said stem is provided at its inner end with a tapering head 6, which, at its larger end is fashioned into a bead 7. The body 2 of the hook is provided with a corresponding inwardly tapering annular shoulder 8 against which the head 6 of the stem bears and upon which said head is adapted to turn freely. At the larger end of the shoulder 8 the base 2 is swaged to form an annular groove 9 for the reception of the bead 7 on the head 6 of the stem 5 as shown in Fig. 2. After the stem 5 is inserted through the tubular or hollow body or base of the hook and brought to the position shown in Fig. 2, the ring 4 is brazed or otherwise permanently fastened to the stem 5 as indicated in Fig. 1. In use, the stem 5 turns with the head 6 and said head is securely retained within the hollow base of the hook. This provides an exceptionally strong and durable connection between the eye and ring or hook.

The movable section 3 of the hook is shown as provided with the usual hinge pintles or trunnions 10 and held normally closed by means of the closing spring 11, said element forming no part of the present invention.

I claim:—

1. A swivel hook comprising a hollow body or base embodying a tapering internal annular shoulder, a ring, and a stem rigidly attached to the ring and entering said base and embodying a tapered head at its inner end engaging said shoulder and adapted to turn freely within the base wherein it is retained by the shoulder.

2. A swivel hook comprising a hollow body or base embodying a tapering internal annular shoulder, and an annular groove adjacent to the shoulder where it is of the greatest diameter, a ring, and a stem rigidly attached to the ring and entering said base and embodying a tapered head at its inner end engaging said shoulder and adapted to turn freely within the base wherein it is retained by the shoulder, and an annular bead on the head engaging said groove.

In testimony whereof I affix my signature in presence of two witnesses.

CARL G. THEILING.

Witnesses:
J. K. DORSETT,
W. E. PERRY.